United States Patent
Chew et al.

(10) Patent No.: US 7,577,849 B2
(45) Date of Patent: Aug. 18, 2009

(54) KEYED-BUILD SYSTEM FOR CONTROLLING THE DISTRIBUTION OF SOFTWARE

(75) Inventors: Chee Chew, Redmond, WA (US); Michael P. Calligaro, Redmond, WA (US); Dominique Fortier, Snoqualmie, WA (US); Igor Borisov Peev, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 565 days.

(21) Appl. No.: 10/406,353

(22) Filed: Apr. 2, 2003

(65) Prior Publication Data

US 2004/0199766 A1 Oct. 7, 2004

(51) Int. Cl.
*H04L 21/00* (2006.01)
(52) U.S. Cl. ....................................... 713/189
(58) Field of Classification Search ................. 713/189
See application file for complete search history.

(56) References Cited

U.S. PATENT DOCUMENTS

| | | | | |
|---|---|---|---|---|
| 4,688,169 | A * | 8/1987 | Joshi ........................ | 726/29 |
| 5,734,819 | A | 3/1998 | Lewis ....................... | 395/186 |
| 6,157,966 | A * | 12/2000 | Montgomery et al. ........ | 710/8 |
| 6,170,060 | B1 * | 1/2001 | Mott et al. .................. | 726/29 |
| 2004/0187092 | A1 * | 9/2004 | Fujiwara .................... | 717/106 |
| 2004/0255034 | A1 * | 12/2004 | Choi .......................... | 709/229 |

FOREIGN PATENT DOCUMENTS

| WO | WO 0144907 A1 * | 6/2001 |
|---|---|---|
| WO | WO 02/01330 A2 | 1/2002 |
| WO | WO 02/29528 A2 | 4/2002 |
| WO | WO 03/003173 A1 | 1/2003 |

OTHER PUBLICATIONS

M. J. Haims, G. Lebizay and A. Weiss; "Memory Storage Space, I/O Storage Space, Cycle Steal, and External Memory Access Protection"; IBM Technical Disclosure Bulletin, vol. 16, No. 9, Feb. 1974; pp. 3042-3046.

* cited by examiner

*Primary Examiner*—Andrew L Nalven
(74) *Attorney, Agent, or Firm*—Merchant & Gould, P.C.

(57) ABSTRACT

A keyed-build system for controlling the distribution of software. The system and method of the present invention control distribution of software by keying computer-executable programs with device identifications. Each of the computing devices of the keyed-build system contains a device identification that is uniquely associated with and is embedded in the device. A computer-executable program for use in a particular computing device is keyed with the device's unique device identification during the build process of the program. When the computer-executable program is launched on a computing device, the device identification in the program is compared with the device identification embedded in the computing device. If the two device identifications do not match, the computer-executable program is disabled.

36 Claims, 4 Drawing Sheets

KEYED-BUILD SYSTEM FOR CONTROLLING THE DISTRIBUTION OF SOFTWARE

BACKGROUND OF THE INVENTION

Protecting rights of digital content has become increasingly difficult in this digital age. Using the Internet, unauthorized copying and sharing of digital content can be carried out with the greatest of ease. One popular approach for protecting rights of digital content is the use of a Digital Rights Management (DRM) system. Conventional DRM systems typically include at least two parties: a content provider and a rights entity. In operation, the user registers with the rights entity and obtains a decryption means. When the user requests digital content from the content provider, the digital content is sent to the user as an encrypted file. The digital content in the file can be accessed after the file has been decrypted using the decryption means.

Conventional DRM systems work well for protecting digital content that is strictly data in nature. Digital data such as music files and video files can be protected using a variety of encryption schemes. However, encryption does not work well for protecting computer software. Unlike data, computer programs are designed to perform operations and often require installation. It is not efficient to use encryption to protect a computer program due to architectural complexity and extraneous operation overhead associated with the required decryption mechanisms. Conventional DRM systems are even less feasible for protecting computer software designed for mobile computing devices, where system resources are of a premium.

An effective and efficient method for controlling illegal distribution of computer software eludes those skilled in the art.

SUMMARY OF THE INVENTION

Briefly stated, the present invention is directed to a keyed-build system for controlling the distribution of software. The system and method of the present invention control distribution of software by keying computer-executable programs with device identifications. Each of the computing devices of the keyed-build system contains a device identification that is uniquely associated with and is embedded in the device. A computer-executable program for use in a particular computing device is keyed with the device's unique device identification during the build process of the program. When the computer-executable program is launched on a computing device, the device identification in the program is compared with the device identification embedded in the computing device. If the two device identifications do not match, the computer-executable program is disabled.

In another aspect, the invention is directed to a computer-readable medium encoded with a data structure that includes a first and second data fields. The first data field contains computer-executable instructions. The second data field is keyed with a device identification uniquely associated with a computing device.

In yet another aspect, the invention is directed to a system for distributing software upgrades that includes a mobile computing device, a commerce server, and an upgrade server. The mobile computing device is uniquely identified by a device identification that is embedded in the device. The commerce server is configured to receive a request for a software upgrade for the mobile computing device and to determine the device identification from the computing device. The upgrade server is configured to receive the device identification from the commerce server, to build the software upgrade keyed with the device identification, and to provide the software upgrade to the mobile computing device.

In still another aspect, the invention is directed to a mobile computing device that includes a computer-readable medium and a memory component. The computer-readable medium is encoded with a first device identification that is uniquely associated with the mobile computing device. The computer-readable medium is configured to prevent the device identification from being altered. The memory component is encoded with a computer-executable program and some computer-executable instructions. The computer-executable program is keyed with a second device identification. The computer-executable instructions are configuring the mobile computing device to compare the first device identification with the second device identification and to render the computer-executable program inoperable if the first device identification and the second device identification do not match.

DETAILED DESCRIPTION OF THE PREFERRED EMBODIMENT

The inventors of the present invention have determined that keying a computer-executable program to a particular computing device can effectively control the distribution of the program without the complexity and computational overhead associated with encrypting the entire program. The inventors have also appreciated that a computer-executable program that is keyed to a computing device will guard against unauthorized use even after the program has been decrypted and installed. Thus, the present invention focuses on a keyed-build system for controlling the distribution of software. The manner in which the distribution of software is controlled by the present invention is very different from conventional methods. For example, some conventional methods prevent unauthorized distribution of a computer-executable program by encrypting the entire file containing the program. The encrypted file is then transmitted to an intended user who has been given the proper decryption means. After the file has been transmitted, the user has to decrypt the file before installing and using the program. However, once the program has been decrypted, the program is no longer protected from unauthorized use. Other methods attempt to cure these deficiencies by incorporating into the operation of a program encryption and decryption mechanisms, which require substantial system resources.

In contrast, the present invention provides a more effective and efficient approach. The system and method of the present invention controls distribution of software by keying computer-executable programs with device identifications, each of which is uniquely associated with a particular computer device. Each computing device is uniquely identified by a device identification. During the build process, computer executable programs distributed in accordance with the present invention are keyed with a unique device identification associated with a particular computing device. To use one of these keyed computer executable programs in a computing device, the device identification in the computer-executable program is authenticated with the device identification in the computing device. The keyed computer executable programs may be configured to go through the authentication process at any time. These and other aspects of the invention will become apparent after reading the following detailed description.

Figure 1:
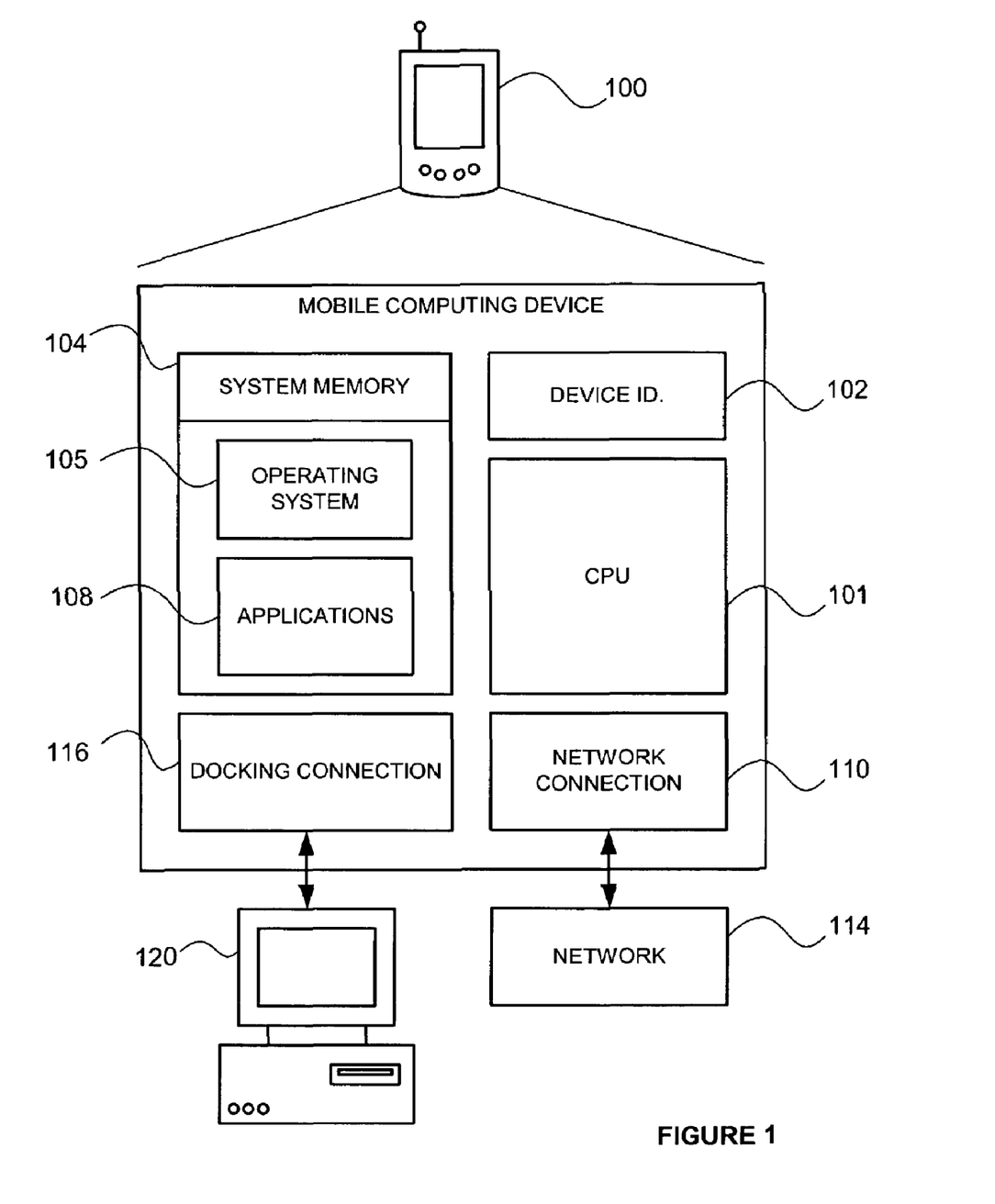
FIG. 1 illustrates an exemplary mobile computing device that may be used in one exemplary embodiment of the present invention.

FIG. 1 illustrates an exemplary mobile computing device that may be used in one exemplary embodiment of the present invention. With reference to FIG. 1, one exemplary system for implementing the invention includes a computing device, such as mobile computing device 100. Many different kinds of computing devices may implement this invention. These computing devices include desktop computers, various mobile computing devices such as personal digital assistants, communication devices such as wireless phones and portable communication devices, and the like. For illustrative purposes, a general mobile computing device 100 will be described. A computing device that is capable of implementing this invention may have more, less, or different components as those shown in FIG. 1.

Mobile computing device 100 may include various hardware components. In a very basic configuration, mobile computing device 100 typically includes a central processing unit 101 and system memory 104. Depending on the exact configuration and type of computing device, system memory 104 may include volatile memory, non-volatile memory, data storage devices, or the like. These examples of system memory 104 are all considered computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by mobile computing device 100. Any such computer storage media may be part of mobile computing device 100.

Mobile computing device 100 may contain network connection 110 that allows the device to communicate with other computing devices over network 114, such as a wireless network, local area network, wide area network such as the Internet, and other communication networks. Network connection 110 is one example of communication media. Communication media may typically be embodied by computer readable instructions, data structures, program modules, or other data in a modulated data signal, such as a carrier wave or other transport mechanism, and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Mobile computing device 100 may also contain docking connection 116 that allows the device to communicate with docking unit 120. Docking connection 116 is another example of communication media. Docking unit 120 is a device that provides enhanced communication capabilities and connectivity to mobile computing device 100. Docking unit 120 may be a desktop computer, laptop computer, or any electronic device that enables mobile computing device 100 to connect to it through a wire or wireless connection, such as USB, serial, blue tooth, infrared, and the like. Docking unit 120 is typically configured to provide a communication link between mobile computing device 100 and other computing devices.

Device identification 102 is a digital identifier embedded in mobile computing device 100 and is uniquely associated with mobile computing device 100. Depending on hardware configuration, device identification 102 may be stored in a variety of locations within mobile computing device 100. Preferably, device identification 102 is embedded in the electronics of mobile computing device 100 in such a way that it cannot be altered. For example, device identification 102 may be stored in a part of the system memory 104 that cannot be overridden or in a hardware component separate from system memory 104.

Software components of mobile computing device 100 are typically stored in system memory 104. Software components include computer-executable programs such as operating system 105 and applications 108. These computer-executable programs may be keyed to mobile computing device 100. Each of the keyed computer-executable programs are keyed with a device identification that uniquely associated with a particular computing device. The device identification is used to authenticate the computer-executable program to ensure that the program is installed on the correct computing device. A process for authenticating keyed computer-executable programs will be discussed in more detail in conjunction with FIG. 4. Briefly stated, in order for the keyed computer-executable program to properly operate in a computing device, the device identification to which the computer-executable program was keyed has to match the device identification embedded in the computing device.

Figure 2:
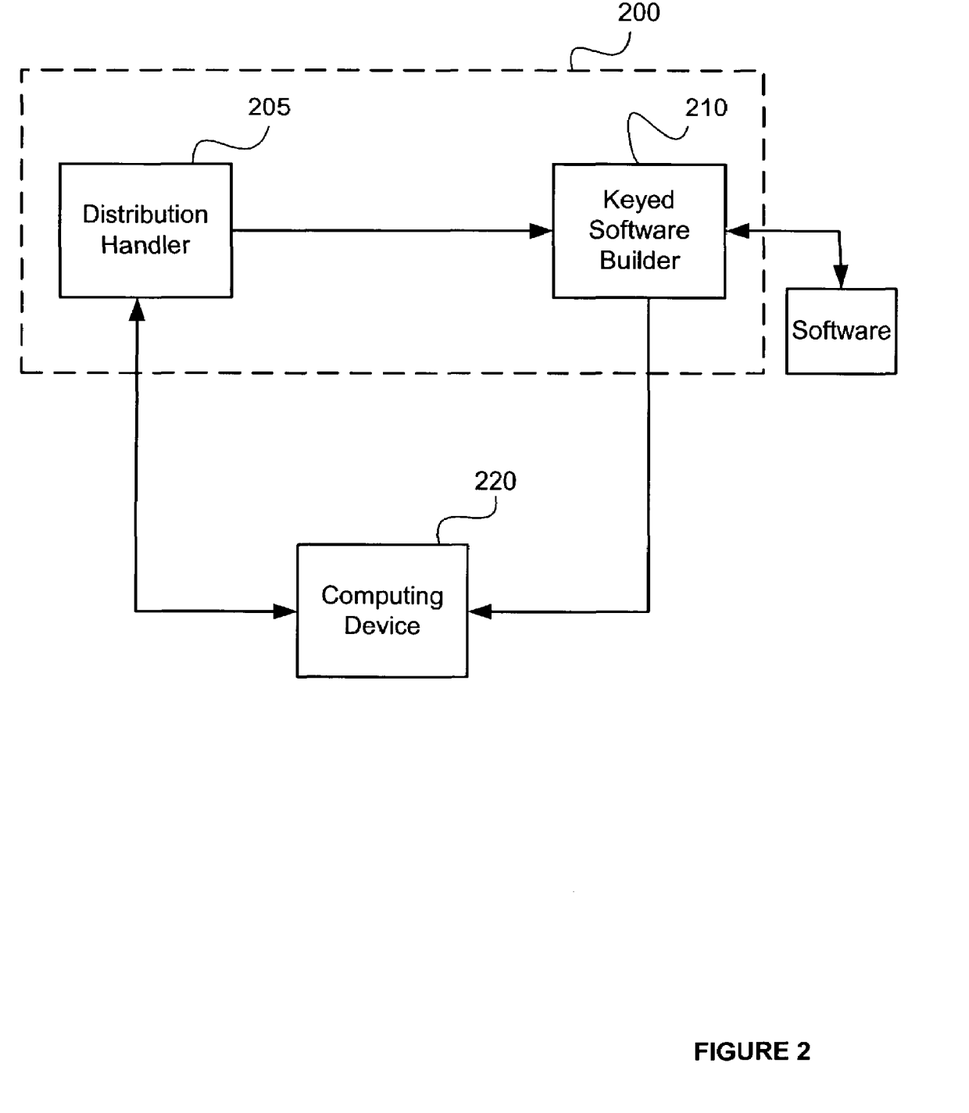
FIG. 2 is a schematic diagram of an exemplary software distribution control system 200, in accordance with one embodiment of the invention.

FIG. 2 is a schematic diagram of an exemplary software distribution control system 200, in accordance with one embodiment of the invention. For illustrative purposes, software distribution control system 200 is shown to include distribution handler 205 and keyed software builder 210. However, in practice, distribution handler 205 and keyed software builder 210 may be combined into a single component.

Distribution handler 205 is a computer-executable component that handles the distribution of software for computing devices, such as computing device 220. Distribution handler 205 is configured to process requests for software for use on computing devices. For each request for software, distribution handler 205 facilitates the distribution of the software that is keyed to a particular computing device with a device identification that is unique to the device.

When a request for software is received, distribution handler 205 is configured to determine a device identification associated with the computing device in which the software will be used. To do so, distribution handler 205 may establish a communication link to the computing device. Any types of wired or wireless network connections that enable distribution handler 205 to obtain data from the computing device may be used to establish the communication link. For example, distribution handler 205 may interact with the computing device through the Internet, a LAN, a wireless communication network, and the like.

Distribution handler 205 may be configured to use a control program to interact with a computing device. The control program enables distribution handler 205 to determine a device identification associated with the computing device. In one embodiment, the control program is an active control that is downloaded from distribution handler 205 to the computing device 220 and executes in a browser environment. In another embodiment, the control program is downloaded to a docketing unit to which computing device 220 is connected. The control program's function is to discover the device identification of computing device 220 and return it to distribution handler 205. Distribution handler 205 is also configured to interact with keyed software builder 210 and to provide the device identification to keyed software builder 210.

Keyed software builder 210 is a computer-executable component for creating a computer-executable program that is keyed to a particular computing device. Keyed software builder 210 is configured to determine a device identification that uniquely identifies a particular computing device. Keyed software builder 210 is also configured to key the device identification in the computer-executable program so that the computer-executable program is uniquely associated with the computing device. Preferably, the device identification is keyed in the computer-executable program in such a way that it could not be easily altered. For example, the device identification may be embedded in a specific location in the binary code of the computer-executable program.

After building a keyed computer-executable program, keyed software builder 210 is configured to make the program available for installation on a computing device. The keyed computer-executable program may be configured to check the device identification associated with the computing device when the program is launched. The keyed computer-executable program will properly operate only if the device identification keyed in the computer-executable program matches the device identification embedded in the computing device. In another configuration, the computing device is configured to authenticate the program using the keyed device identification.

In operation, a request for software for computing device 220 is made to distribution handler 205. When distribution handler 205 receives the request, distribution handler 205 establishes a communication link with computing device 220. Distribution handler 205 determines a device identification from computing device 220 and validates the device identification. If the device identification is valid, distribution handler 205 determines a computer-executable program that is appropriate for mobile computing device 100. Distribution handler 205 sends the device identification and information about the requested computer-executable program to keyed software builder 210.

When keyed software builder 210 receives the device identification and information about the requested software, keyed software builder 210 builds the computer-executable program and keys the device identification in the program during the build process. The computer-executable program keyed with the device identification is then returned to computing device 220 for installation.

Figure 3:
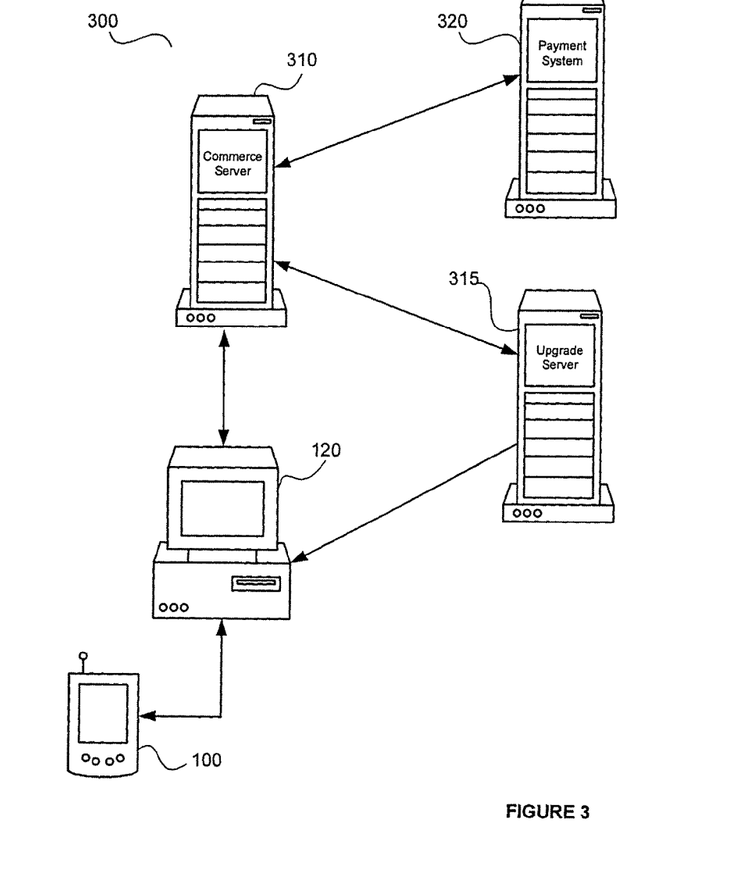
FIG. 3 is a schematic diagram of an exemplary software upgrade control system 300, in accordance with another embodiment of the invention.

FIG. 3 is a schematic diagram of an exemplary software upgrade control system 300, in accordance with another embodiment of the invention. Software upgrade control system 300 enables users to purchase software upgrades that are keyed to their particular computing devices. These software upgrades may be any type of computer-executable programs. In one embodiment, the software upgrades include a new version of the software that is currently found on mobile computing device 100. In one configuration, software upgrade control system 300 includes commerce server 310 and upgrade server 315. Both servers may be combined to form a single server in another configuration. For illustrative purposes, FIG. 3 only shows software upgrade control system 300 interacting with a mobile computing device 100 described in FIG. 1. However, software upgrade control system 300 may interact with any type of computing devices.

As shown in the figure, mobile computing device 100 is connected to docking unit 120. In this embodiment, docking unit 120 is a personal computer that is configured to interact with mobile computing device 100. Docking unit 120 may be configured to determine a device identification associated with mobile computing device 100 and to store the device identification so that it can be provided to commerce server 310. Storing the device identification enables a user to purchase keyed software upgrades for mobile computing device 100 when it is not connected to docking unit 120. Docking unit 120 is also configured to enable users to interact with other computing devices through the Internet. For example, using docking unit 120, a user may purchase software upgrades for mobile computing device 100 by interacting with commerce server 310.

Commerce server 310 may include one or more computing devices and is configured to enable users to electronically purchase software. For example, commerce server 310 may receive and process purchase requests for software upgrades from docking unit 120. When a purchase request is received, commerce server 310 is configured to determine a device identification associated with the computing device on which the requested software upgrades are to be used. Commerce server 310 is also configured to determine whether a device identification is valid. In one embodiment, commerce server 310 is configured to host a webpage with an embedded ACTIVEX Control. The ACTIVEX Control determines the device identification from mobile computing device 100. Commerce server 310 may be configured to obtain the device identification from docking unit 120.

Commerce server 310 is also configured to handle payment transactions associated with the software upgrade purchase by interacting with payment system 320. For example, commerce server 310 may enable a software upgrade purchase to be made with a credit card. In this example, commerce server 310 may be configured to process and confirm a credit transaction by interacting with payment system 320, which may be a server configured to provide credit card verification and processing services. To provide a software upgrade purchased by a user for mobile computing device 100, commerce server 310 is configured to interact with and provide the device identification of mobile computing device 100 to upgrade server 315.

Upgrade server 315 is configured to interact with commerce server 310 and to key a device identification in a software upgrade. Upgrade server 315 has access to data for building one or more software upgrades. Upgrade server 315 may receive information associated with a software upgrade purchase from commerce server 310. The information may include a device identification, an Internet address or email address of the user requesting the software, and the like. Using the information, upgrade server 315 is configured to build a software upgrade and to key it with the device identification. Upgrade server 315 is also configured to provide the keyed software upgrade to the user. For example, upgrade server 315 may send the software upgrade to the user by email, allow the user to download the software upgrade through the Internet, or some other similar delivery methods.

Figure 4:
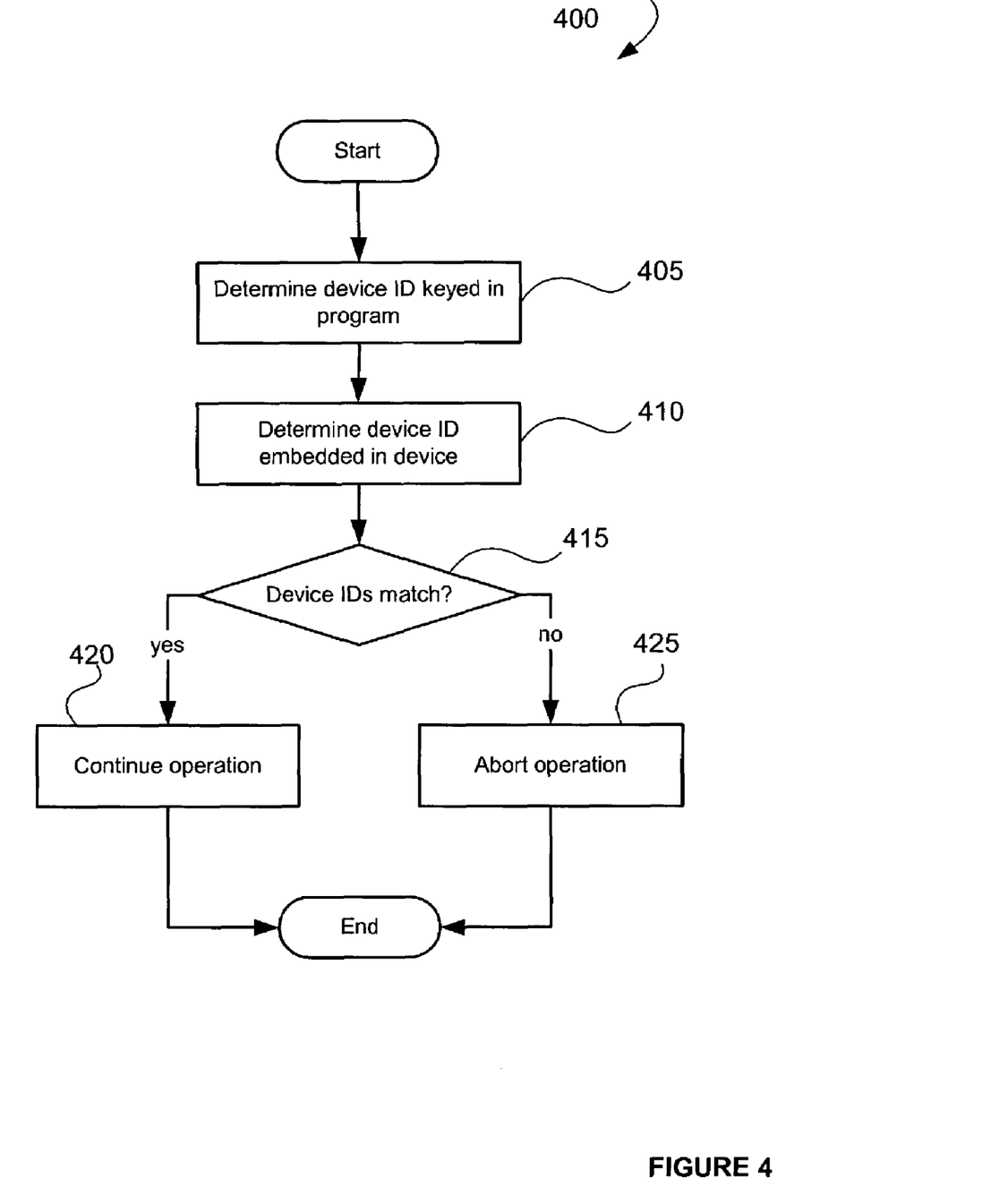
FIG. 4 is an operational flow diagram of an exemplary process 400 for authenticating a keyed computer-executable program for use on a computing device.

FIG. 4 is an operational flow diagram of an exemplary process 400 for authenticating a keyed computer-executable program for use on a computing device. Process 400 may be used by the keyed computer-executable program to self-authenticate. Process 400 may also be used by other computer-executable programs, such as the operating system of the computing device, to authenticate a keyed computer-executable program. Process 400 may be performed during an operation associated with an installation of the keyed computer-executable program, an operation executed subsequent to the installation, or an operation executed during a boot process of the computing device.

From a start block, process 400 moves to block 405 where the device identification keyed in the computer-executable program is determined. At block 410, the device identification embedded in the computing device is determined.

At block 415, a determination is made whether the keyed device identification matches the device identification embedded in the computing device. If the device identifications match, process 400 moves to block 420 where the operation is continued. Then, the process ends.

Returning to block 415, if the device identifications do not match, process 400 moves to block 425 where the operation is aborted. The computing device may be configured so that aborting the operation disables the computing device.

The above specification, examples and data provide a complete description of the invention. Since many embodiments of the invention can be made without departing from the spirit and scope of the invention, the invention resides in the claims hereinafter appended.

What is claimed is:

1. A computer-implemented method for providing a computer-executable program comprising:
    determining a first device identification associated with a first device;
    storing the first device identification at a docking unit;
    determining the first device is not docked at the docking unit;
    in response to determining the first device is not docked, sending a request for a computer-program from the docking unit, the request including the first device identification;
    in response to receiving the request including the first device identification, initially building the computer-executable program by:
        automatically keying the computer-executable program with the first device identification;
        configuring the computer-executable program to determine a second device identification embedded in a computing device;
        configuring the computer-executable program to disable itself if the first device identification does not match the second device identification;
        configuring the computer-executable program to run if the first device identification does match the second device identification; wherein building the computer-executable program occurs after the first device identification is determined;
    determining the first device is docked at the docking unit; and
    in response to determining the first device is docked at the docking unit, installing the computer-executable program at the first device.

2. The computer-implemented method of claim 1, wherein keying the computer-executable program includes incorporating the device identification into the binary code of the computer-executable program.

3. The computer-implemented method of claim 1, wherein determining a first device identification further comprising establishing a communication link with the computing device.

4. The computer-implemented method of claim 3, wherein the communication link is secured.

5. A computer-implemented method for authenticating a computer-executable program by a computing device comprising:
    determining a keyed device identification associated with the computing device;
    storing the keyed device identification at a second device;
    in response to receiving the keyed device identification from the second device, building the computer-executable program having the keyed device identification by:
        automatically keying the computer-executable program with the keyed device identification;
        configuring the computer-executable program to determine an embedded device identification uniquely associated with a device running the computer-executable program;
        configuring the computer-executable program to disable itself if the keyed device identification does not match the embedded device identification;
        configuring the computer-executable program to run if the keyed device identification does match the embedded device identification;
    performing an operation associated with the computer-executable program on the computing device;
    determining the embedded device identification uniquely associated with the computing device;
    authenticating the keyed device identification by determining whether the keyed device identification substantially matches the embedded device identification; and
        in response to determining the keyed device identification is authenticated, allowing the computer-executable program to run, and
        in response to determining the keyed device identification is not authenticated, aborting the operation.

6. The computer-implemented method of claim 5, wherein the operation is associated with launching the computer-executable program in the computing device.

7. The computer-implemented method of claim 5, wherein the operation is associated with booting the computing device after the computer-executable program has been installed.

8. The computer-implemented method of claim 5, wherein authenticating the keyed device identification includes determining whether the keyed device identification exactly matches the embedded device identification.

9. The computer-implemented method of claim 5, wherein aborting the operation includes disabling the computing device.

10. A computer-implemented method for upgrading software in a mobile computing device comprising:
    receiving a keyed device identification of the mobile computing device at a second device;
    storing the keyed device identification on the second device;
    sending a request for a software upgrade from the second device, the request including the keyed device identification;
    receiving a build of a software upgrade at the mobile computing device, the software upgrade configured to determine an embedded device identification, disable the software upgrade if the keyed device identification does not match the embedded device identification, and to run the software upgrade if the keyed device identification does match the embedded device identification;
    performing an operation associated with the software upgrade on the mobile computing device;
    determining an embedded mobile device identification uniquely associated with the mobile computing device;

comparing the keyed device identification with the embedded mobile device identification; and if the keyed device identification does not match the embedded mobile device identification of the mobile computing device, aborting the operation, and performing the upgrade when the keyed device identification does match the embedded device identification of the mobile computing device.

11. The computer-implemented method of claim 10, wherein the software upgrade is a newer version of the software currently in the mobile computing device.

12. The computer-implemented method of claim 10, wherein the software upgrade includes a newer version of an operating system currently executing in the mobile computing device.

13. The computer-implemented method of claim 10, wherein the operation includes launching the software upgrade in the mobile computing device.

14. The computer-implemented method of claim 10, wherein the operation includes booting the mobile computing device.

15. A computer-implemented method for distributing a software upgrade comprising:
   receiving a request to upgrade software for a mobile computing device from a second device;
   establishing a communication link with the second device, the second device storing a device identification uniquely associated with the mobile computing device;
   receiving the device identification uniquely associated with the mobile computing device;
   determining an appropriate software upgrade for the mobile computing device;
   automatically building the initial software upgrade keyed with the device identification after the device identification is determined, the building including:
      automatically keying the software upgrade with the device identification;
      configuring the software upgrade to determine an embedded device identification uniquely associated with a device running the software upgrade;
      configuring the software upgrade to disable itself if the device identification does not match the embedded device identification;
      configuring the software upgrade to run if the device identification does match the embedded device identification;
   making the software upgrade available for installation in the mobile computing device.

16. The computer-implemented method of claim 15, wherein establishing the communication link with the mobile computing device is performed through a docking unit.

17. The computer-implemented method of claim 15, wherein establishing the communication link is performed using an active control program.

18. The computer-implemented method of claim 17, wherein the control program is an embedded Control.

19. The computer-implemented method of claim 15, wherein establishing the communication link with the second device is performed through a wireless network.

20. The computer-implemented method of claim 15, wherein determining an appropriate software upgrade is performed using the device identification.

21. The computer-implemented method of claim 15, further comprising:
   receiving payment information associated with the request to upgrade software; and
   processing payment transaction by interacting with a payment system.

22. A computer-readable storage medium encoded with a computer-executable component, the computer-executable component comprising computer-executable instructions, the computer-executable instructions configured to:
   receive a request from a second computing device to build a computer-executable program for a computing device;
   determine a device identification uniquely associated with the computing device;
   build a computer-executable program, the building of the computer-executable program comprising:
      inserting the device identification in the computer-executable program;
      configuring the computer-executable program to determine an embedded device identification uniquely associated with a device running the computer-executable program;
      configuring the computer-executable program to disable itself if the device identification does not match the embedded device identification;
      configuring the computer-executable program to run if the device identification does match the embedded device identification;
   wherein building the computer-executable program occurs after the device identification is determined, and
   provide the computer-executable program to the computing device.

23. The computer-readable medium of claim 22, wherein the computer-executable component is further configured to establish a secured communication link with the second computing device.

24. The computer-readable medium of claim 22, wherein the computer-executable component is further configured to determine which computer-executable program to build based on the device identification.

25. The computer-readable medium of claim 22, wherein the computer-executable component is further configured to validate the device identification.

26. A computer-readable storage medium encoded with a data structure comprising:
   a first data field having computer-executable instructions for performing authenticating operations;
   a second data field keyed with a device identification uniquely associated with a computing device; wherein the device identification is accessed by the computer-executable instructions for performing the authenticating operations; and wherein the encoding of the data structure includes:
      receiving the device identification uniquely associated with the computing device from a second device;
      determining a software upgrade for the device based on the device identification;
      inserting the device identification into the second data field;
      configuring the computer-executable program to determine an embedded device identification embedded in a computing device;
      configuring the software upgrade to disable itself if the device identification does not match the embedded device identification;
      configuring the software upgrade to run if the device identification does match the embedded device identification;

in response to the determination of the software upgrade, inserting software upgrade computer-executable instructions into the data structure; and building the data structure; and providing the data structure to the device.

27. The computer-readable medium encoded of claim 26, wherein the second data field is incorporated into the first data field.

28. The computer-readable medium encoded of claim 26, wherein the first data field includes computer-executable instructions for authenticating the device identification.

29. The computer-readable medium encoded of claim 28, wherein the first data field includes computer-executable instructions for disabling the computing device if the device identification is not authenticated.

30. The computer-readable medium encoded of claim 26, wherein the data structure is encrypted.

31. A system for distributing software upgrades comprising:

a mobile computing device uniquely identified by a device identification, the device identification being embedded in the mobile computing device;

a docking device configured to store the device identification of the mobile computing device;

a commerce server configured to receive a request from the docking device for a software upgrade for the mobile computing device and to determine the device identification from the computing docking device; and an upgrade server configured to receive the device identification from the commerce server, to build the software upgrade keyed with the device identification wherein building the software upgrade occurs after the device identification is received, the building of the software upgrade including:

automatically keying the software upgrade with the device identification;

configuring the software upgrade to determine a second device identification embedded in a computing device;

configuring the software upgrade to disable itself if the device identification does not match the second device identification;

configuring the software upgrade to run if the device identification does match the second device identification;

wherein the upgrade server is further configured to provide the software upgrade to the mobile computing device.

32. The system of claim 31, wherein the docking device is detachably and electronically connected to the mobile computing device.

33. The system of claim 31, wherein the commerce server is configured to connect to the mobile computing device using a control program.

34. The system of claim 31, wherein the control program is an embedded control.

35. The system of claim 31, wherein the commerce server is configured to process a payment transaction associated with the request for the software upgrade.

36. The system of claim 31, wherein the upgrade server is further configured to encrypt the keyed software upgrade.

* * * * *